(12) United States Patent
Kienitz et al.

(10) Patent No.: US 12,105,113 B2
(45) Date of Patent: Oct. 1, 2024

(54) FIBRE-OPTIC ACCELEROMETER

(71) Applicant: fos4X GmbH, Munich (DE)

(72) Inventors: Sascha Kienitz, Munich (DE); Laura Lohr, Munich (DE); Markus Brams, Munich (DE)

(73) Assignee: Polytech Group ApS (DK)

( * ) Notice: Subject to any disclaimer, the term of this patent is extended or adjusted under 35 U.S.C. 154(b) by 8 days.

(21) Appl. No.: 17/906,320

(22) PCT Filed: Mar. 11, 2021

(86) PCT No.: PCT/EP2021/056152
§ 371 (c)(1),
(2) Date: Sep. 14, 2022

(87) PCT Pub. No.: WO2021/185667
PCT Pub. Date: Sep. 23, 2021

(65) Prior Publication Data
US 2023/0349944 A1 Nov. 2, 2023

(30) Foreign Application Priority Data
Mar. 16, 2020 (DE) .......................... 102020107180.9

(51) Int. Cl.
*G01P 15/093* (2006.01)
*F03D 17/00* (2016.01)
(Continued)

(52) U.S. Cl.
CPC ............ *G01P 15/093* (2013.01); *F03D 17/00* (2016.05); *G01P 15/0802* (2013.01); *G01P 15/18* (2013.01); *F05B 2260/83* (2013.01)

(58) Field of Classification Search
CPC ................ C03C 23/0025; C03C 15/00; H05K 2203/107; G01P 15/093; G01P 15/0802;
(Continued)

(56) References Cited

U.S. PATENT DOCUMENTS 5,101,669 A * 4/1992 Holm-Kennedy .......................... G01P 15/0802
361/278
5,437,186 A * 8/1995 Tschulena ............. G01P 15/093
250/227.21
(Continued)

FOREIGN PATENT DOCUMENTS

| DE | 11 2005 003758 B4 | 12/2011 |
|---|---|---|
| DE | 10 2014 117914 A1 | 6/2016 |
| EP | 3227552 B1 | 7/2019 |

OTHER PUBLICATIONS

International Search Report and partial translation for corresponding PCT/EP2021/056152, dated Jun. 21, 2021, 11 pages.

*Primary Examiner* — Victor L MacArthur
(74) *Attorney, Agent, or Firm* — Crowell & Moring LLP

(57) ABSTRACT

The invention relates to a fibre-optic accelerometer for determining acceleration along an axis, comprising an optical fibre with a fibre end face and an acoustic membrane with a membrane frame, a deflection mass and connection bridges, the acoustic membrane being designed to reflect, at least in part, a primary radiation from the fibre end face, and the connection bridges connecting the membrane frame and the deflection mass at least at two different axial positions.

18 Claims, 5 Drawing Sheets

Figure 1:
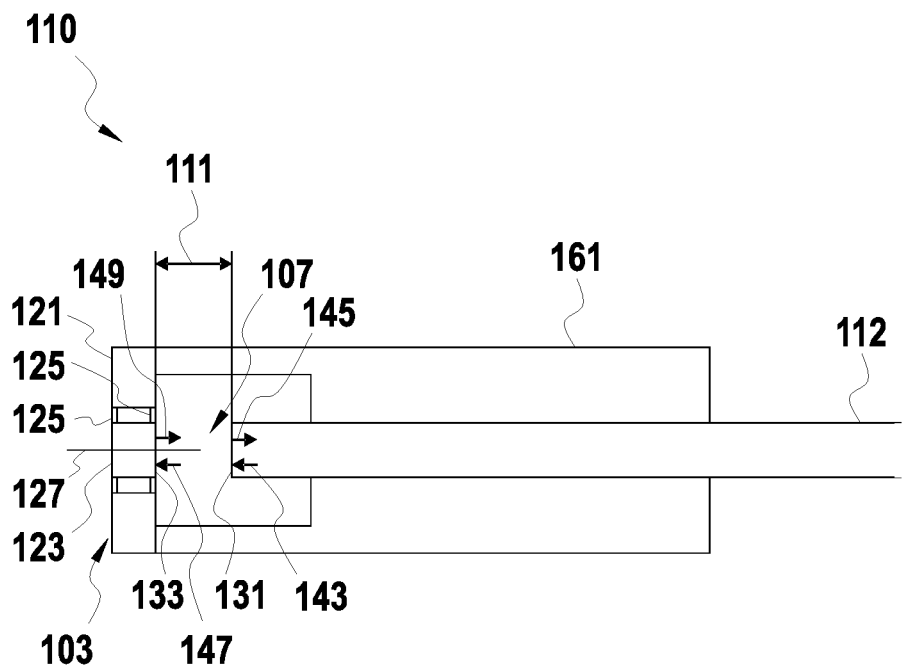

(51) Int. Cl.
   *G01P 15/08*    (2006.01)
   *G01P 15/18*    (2013.01)
(58) Field of Classification Search
   CPC ............. G01P 15/18; G01P 2015/0837; G01P 2015/0854; G01P 2015/0857; F03D 17/00; F05B 2260/83; Y02E 10/72
   See application file for complete search history.

(56) References Cited

U.S. PATENT DOCUMENTS

| | | | |
|---|---|---|---|
| 10,422,321 B2 * | 9/2019 | Müller | .................. F03D 17/00 |
| 2018/0156643 A1 * | 6/2018 | Knoppers | ............. G01L 5/0057 |
| 2018/0259410 A1 * | 9/2018 | Müller | ................... G02B 6/262 |
| 2019/0360323 A1 | 11/2019 | Jung et al. | |

* cited by examiner

FIBRE-OPTIC ACCELEROMETER

CROSS-REFERENCE TO RELATED APPLICATIONS

This application is a national stage application under 35 U.S.C. § 371, which claims priority to PCT application Serial No. PCT/EP2021/056152, filed Mar. 11, 2021, and to DE 10 2020 107180.9 filed Mar. 16, 2020, each of which is incorporated by reference herein in its entirety.

Technical Field

Embodiments of the present invention in general relate to a fiber optical acceleration sensor, in particular for determining an acceleration along an axis and further to a method for the manufacture of a fiber optical acceleration sensor. In particular, the embodiments relate to a fiber optical acceleration sensor system as well as to a wind turbine.

Prior Art

The measurement, monitoring or regulation of the acceleration of measurement objects is of great significance in many areas of the industrial application. Conventional acceleration measurement systems use a spring mass system for determining an acceleration and are based on the detection of a deflection of a measurement object from a rest position. The detection of the deflection of a membrane can take place by means of a change of light properties, in particular in a fiber optical measurement system. In order to design such a fiber optical measurement system to be more sensitive, the spring action of the membrane is conventionally changed or the membrane is impinged with an additional mass, which in many cases leads to an asymmetric construction of the spring mass system.

However, previously known solutions in connection with the measurement of an acceleration have different disadvantages. Conventional fiber optical measurement systems have in particular a cross-sensitivity to rotation accelerations or a low stability or a low sensitivity.

SUMMARY OF THE INVENTION

An aspect relates to a fiber optical acceleration sensor for determining an acceleration along an axis, comprising an optical fiber with a fiber end face, and an acoustic membrane with a membrane frame, a deflection mass and connection bridges, wherein the acoustic membrane is adapted to at least partially reflect a primary radiation exiting from the fiber end face, and wherein the connection bridges connect the membrane frame and the deflection mass at at least two axial positions different from each other.

A further aspect relates to a fiber optical acceleration sensor system with at least two fiber optical acceleration sensors according to embodiments described herein, wherein the fiber optical acceleration sensor system is adapted to determine accelerations along at least two axes.

Even a further aspect relates to a wind turbine with at least one fiber optical acceleration sensor according to embodiments described herein or at least one fiber optical acceleration sensor system according to embodiments described herein.

A further aspect relates to a method for the manufacture of a fiber optical acceleration sensor for determining an acceleration along an axis, in particular a fiber optical acceleration sensor according to embodiments described herein, comprising provision of a transparent substrate and selective laser etching of an acoustic membrane from the transparent substrate, wherein the acoustic membrane comprises a membrane frame, a deflection mass and connection bridges, and wherein the connection bridges connect the membrane frame and the deflection mass at at least two axial positions different from each other.

SHORT DESCRIPTION OF THE DRAWINGS

Figure 2:
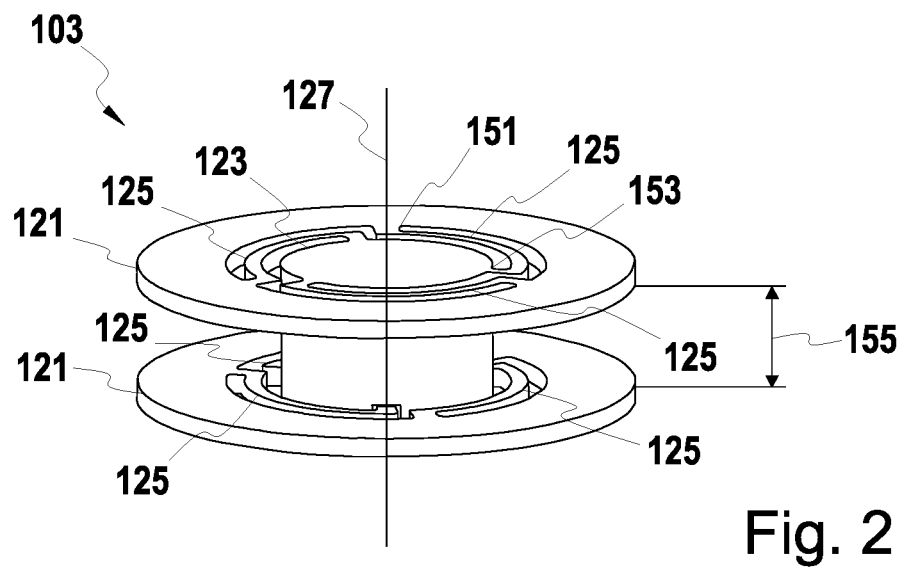
Figure 3:
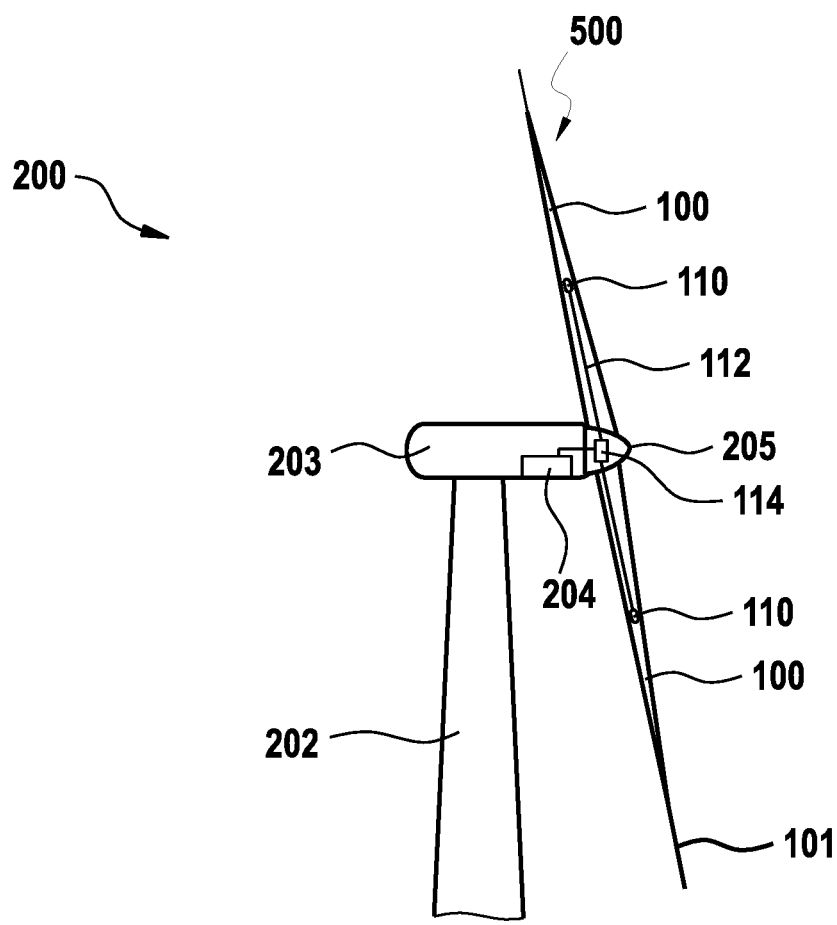
Figure 4:
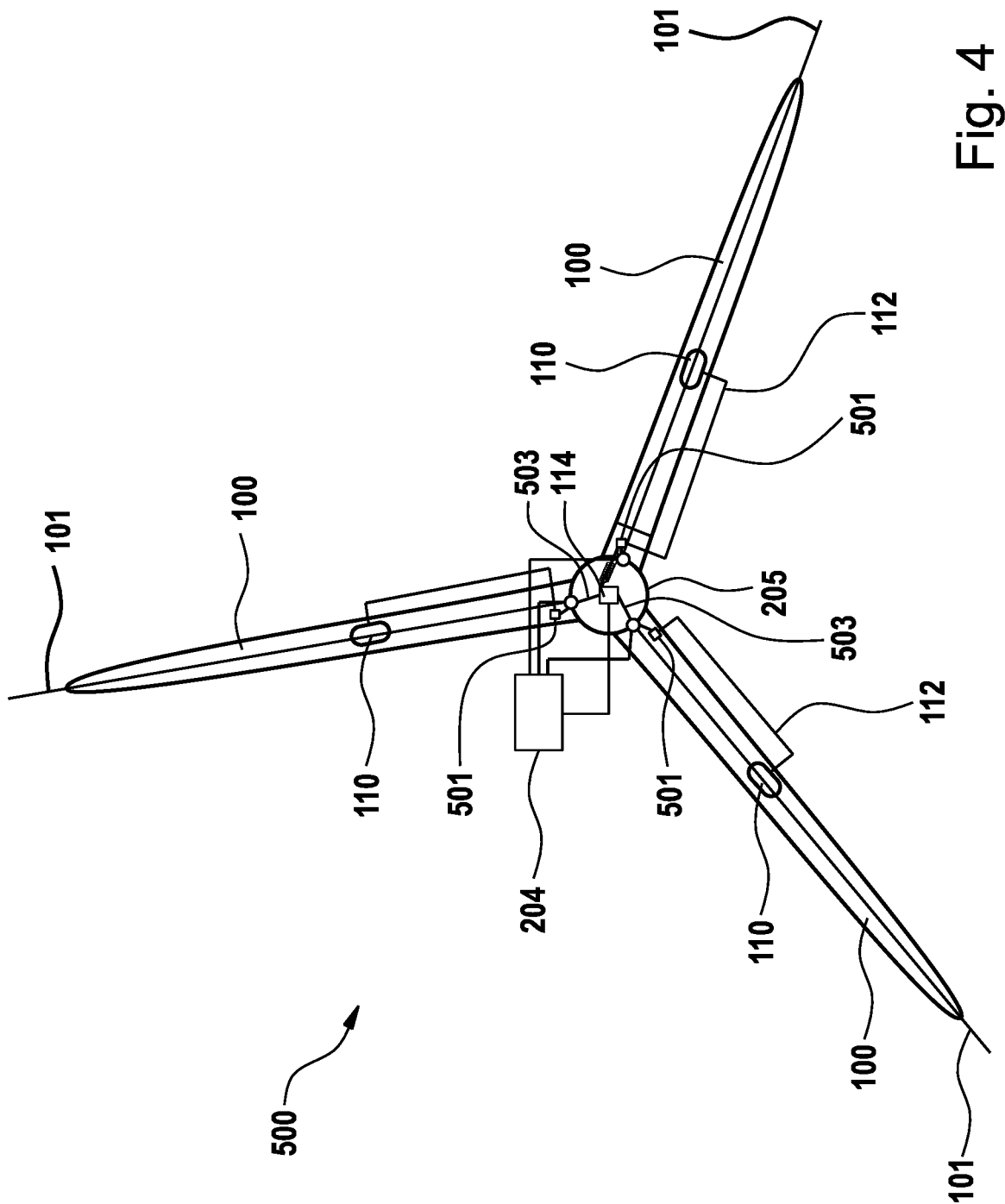
Figure 5:
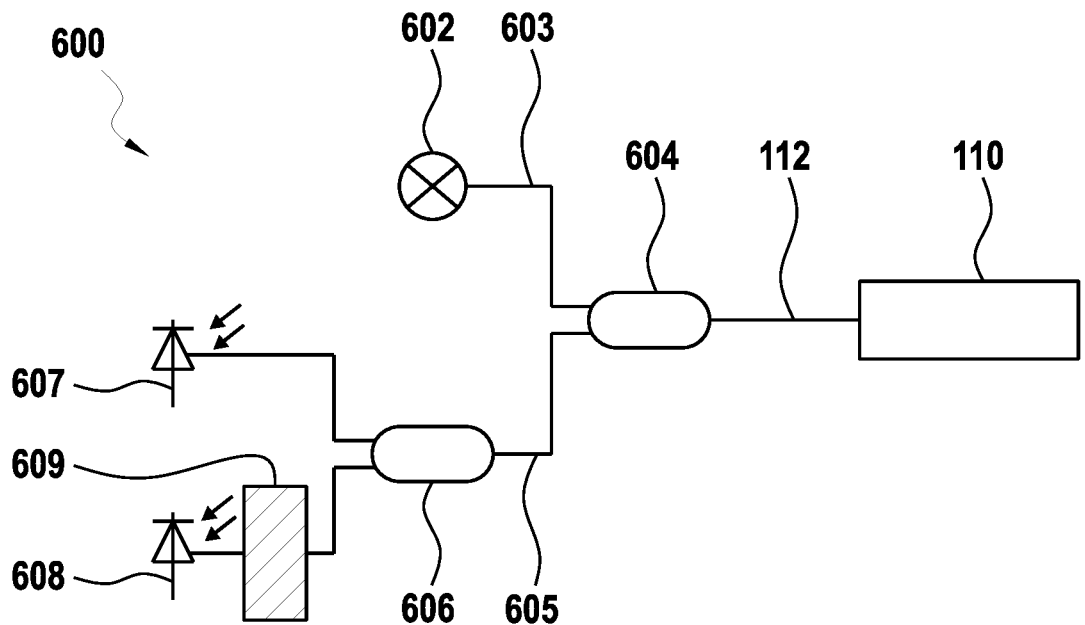
Figure 6:
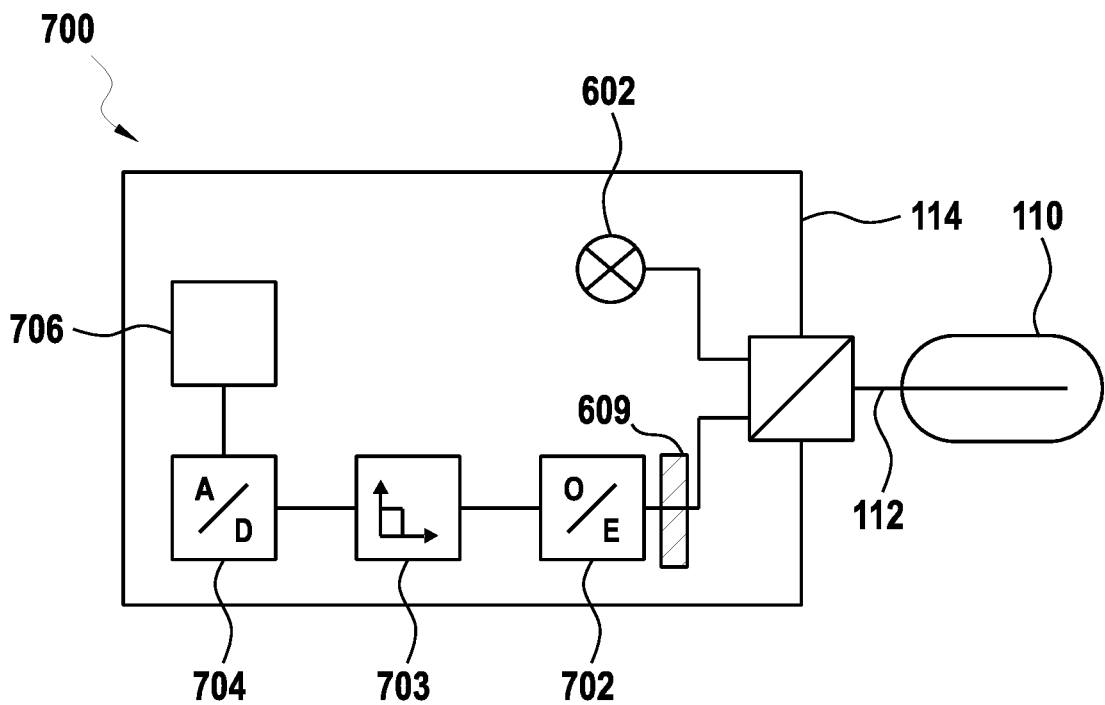
Figure 7:
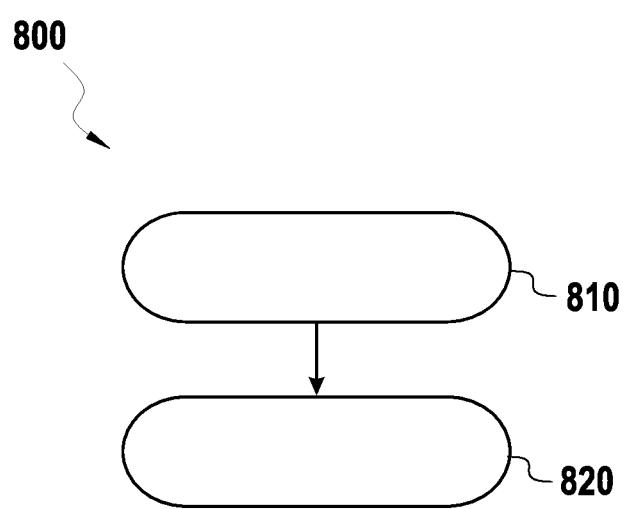

Exemplary embodiments are illustrated in the drawings and will be explained in more detail in the following description:

FIG. 1 schematically shows a fiber optical acceleration sensor with associated radiation path, according to an embodiment;

FIG. 2 schematically shows an acoustic membrane of a fiber optical acceleration sensor according to an embodiment;

FIG. 3 schematically shows a part of a wind turbine with rotor blades with fiber optical acceleration sensors arranged thereon;

FIG. 4 schematically shows a rotor of a wind turbine with rotor blades and fiber optical acceleration sensors according to embodiments described herein;

FIG. 5 schematically shows a measurement system for a fiber optical measurement system according to embodiments described herein;

FIG. 6 schematically shows a further measurement system according to embodiments described herein; and FIG. 7 shows a flow chart for illustrating a method for the manufacture of a fiber optical acceleration sensor according to embodiments described herein.

In the drawings, the same reference numbers denote the same or functionally identical components or steps. For the sake of clarity, not all features of a type are provided with a reference number, for example the connection bridges (reference number: 125) in FIG. 1.

Ways for the Execution of the Invention

In the following, reference is made to different embodiments of the invention in a detailed manner, wherein one or more examples are illustrated in the drawings. The term "or" is in particular to be understood as "and/or" herein.

Fiber optical sensors which are based on an acceleration-dependent change of, for example, the light intensity or the light phase of the light propagating through the optical fiber have a great use potential. The fiber optical acceleration measurement is thus advantageous in regions of measurement objects which are subjected to lightning strike and therefore are not accessible for an electrical measurement. Conveniently, respective electrical lines are here avoided along the measurement object so that a data detection can take place in a purely optical manner.

For the measurement of accelerations with high resolution, fiber optical acceleration sensors according to embodiments described herein are used, which have an optical fiber and an acoustic membrane. The acoustic membrane, for example a deflection mass of the acoustic membrane, and a fiber end face of the optical fiber can be designed in a reflective manner. Thus, an optical resonator of a Fabry-Perot-interferometer can be comprised of the optical fiber and the acoustic membrane. When accelerating the fiber optical acceleration sensor relative to the membrane frame, the deflection mass of the acoustic membrane can be deflected, wherein in particular an interference wave length of the optical resonator can be changed. The acceleration can be detected via the change of the interference wavelength.

Examples of measurement objects in which an acceleration measurement without any electrical lines should take place are rotor blades of wind turbines or airfoils of aircrafts. By suitable arrangement techniques, distributed fiber optical acceleration sensors can be arranged on such measurement objects in order to detect accelerations, for example vibrations. Consequently, such as for example wind turbines are subjected to a complex control which is based on sensor data from the wind turbine itself, for example on reliable acceleration data. A transmission of optical signals by means of an optical fiber brings about a reduced risk of a lightning damage. As a result of this, fiber optical acceleration sensors can be made available in such a way that they permit a mounting in a radially outer region of a rotor blade without increasing the risk of a lightning damage.

FIG. 1 schematically shows a fiber optical acceleration sensor 110 which can be formed as a Fabry-Perot-interferometer. The fiber optical acceleration sensor 110 is particularly illustrated in a longitudinal section along an axis 127 along which the fiber optical acceleration sensor 110 can measure an acceleration. Furthermore, a radiation path is illustrated for the illustration of the principles of the invention. The fiber optical acceleration sensor 110 comprises an optical fiber 112 with a fiber end face 131 and an acoustic membrane 103. For the sake of simplification, only a part of the optical fiber 112 is shown in FIG. 1 while a fiber sheathing and a fiber protective cover is not illustrated for the sake of clarity.

A cavity 107 is formed between the fiber end face 131 and the acoustic membrane 103, in particular between the fiber end face 131 and the deflection mass 123. The acoustic membrane 103 comprises a membrane frame 121, connection bridges 125 and a deflection mass 123. The membrane frame 121 is arranged at least substantially in a stationary manner, in particular relative to the fiber end face 131. For example, the membrane frame 121 is fixedly connected to the optical fiber 112. The deflection mass 123 is connected to the membrane frame 121 via the connection bridges 125. The connection bridges can be formed as resilient elements between the membrane frame 121 and the deflection mass 123. When accelerating the fiber optical acceleration sensor 110, the deflection mass 123 can be deflected relative to the membrane frame 121. In particular, the deflection mass 123 can be deflected along the axis 127. According to embodiments, the deflection mass 123 can have an at least substantially cylinder shape, wherein, for example, the cylinder axis of the cylinder-shaped deflection mass 123 runs along the axis 127.

According to embodiments, the acoustic membrane 103 has a reflective membrane surface. The reflective membrane surface is in particular oriented perpendicular to the axis 127. For example, in FIG. 1, an axial membrane surface 133 is formed on a side of the acoustic membrane 103, facing the cavity 107, as a reflective membrane surface. In particular, the reflective membrane surface and the fiber end face 131 are oriented at least substantially parallel to each other. The fiber end face 131 can be designed in a reflective manner. In further embodiments, a further reflective surface is arranged in the beam path between the fiber end face 131 and the acoustic membrane 103.

Herein, "reflective" or a "mirror" is to be particularly understood in such a way that at least one proportion of the intensity of an irradiated light beam is reflected, for example a proportion of at least 0.5% of the irradiated light beam, in particular a proportion of at least 1% or at least 2%.

In FIG. 1, a light is irradiated across the optical fiber 112 into the fiber optical acceleration sensor 110. For example, a first incident beam 143 from the optical fiber 112 impacts the fiber end face 131. A first part of the first incident beam 143 is reflected back to the optical fiber 112 on the fiber end surface 131 as first reflective beam 145. A second part of the first incident beam 143 is, on the fiber end face 131 as second incident beam 147, in particular as primary beam from the optical fiber 112, transmitted to the cavity 107 between the fiber end face 131 and the acoustic membrane 103. The second incident beam 147 impacts the acoustic membrane 103, in particular the deflection mass 123 of the acoustic membrane 103. The second incident beam 147 is at least partially reflected on a reflective membrane surface, in FIG. 1, for example, on the axial membrane surface 133 of the deflection mass 123, said axial membrane surface facing the cavity 107. In particular, at least a part of the second incident beam 147, for example as second reflective beam 149, is reflected back to the cavity 107 and in the direction of the optical fiber 112. A proportion of the second reflective beam 149 transmitted through the fiber end face 131 can, in the optical fiber 112, interfere with the first reflective beam 143, for example. Moreover, the light can be reflected multiple times between the fiber end face 131 and the deflection mass 123. The fiber end face 131 of the optical fiber 112 serves in particular as a reflection surface for light from the optical fiber 112, as a light exit surface for emitting light from the optical fiber in the direction towards the acoustic membrane 103, and as a light entry surface for receiving light which is reflected from the cavity 107 back to the optical fiber 112.

Through the interference of reflective beams, in particular of the first reflective beam 145, of the second reflective beam 149 or beams reflected multiple times, an interference pattern can form in accordance with the Fabry-Perot-effect. The interference pattern can be used to determine an acceleration acting upon the fiber optical acceleration sensor 110. For example, a cavity length 111 of the cavity 107 or a deflection of the deflection mass 123 can be determined and based on this an acceleration of the fiber optical acceleration sensor 110. In further embodiments, the acceleration can be determined from the interference pattern via a mathematical function or a lookup table.

In a Fabry-Perot-interferometer, as is also illustrated in FIG. 1, a free spectral region, FSR, in which a wavelength spacing can be clearly determined, is provided. This means that no ambiguities occur in the measurement signal in case of a measurement within the free spectral region. The cavity length 111, d, which is illustrated in FIG. 1, is determined by the following equation:

$$d = \frac{\lambda_1 \lambda_2}{2n\Delta\lambda\cos(\theta)} \text{ wherein } \Delta\lambda = \lambda_2 - \lambda_1$$

wherein $\Delta\lambda$ denotes the wavelength difference between two interference minima at $\lambda_1$ and $\lambda_2$, n denotes the index of refraction of the medium enclosed in the cavity, for example air, and $\theta$ denotes the angle of the surface normal of the reflection surfaces and of the direction of light propagation in the optical resonator.

A phase difference between the reflective beams, for example between the first reflective beam 145, the second reflective beam 149 or beams, which are reflected multiple times, is determined by the cavity length 111. In particular, the phase difference is determined by the spacing d between the fiber end face 131 and the reflective membrane surface, for example of the axial membrane surface 133. In other words, the interferometer build-up is such that light can enter into the cavity 107 and can be reflected on the acoustic membrane 103. The reflective membrane surface, the fiber end face 131 and the cavity 107 thus form the optical resonator, as for example an optical resonator of a Fabry-Perot-interferometer. The light reflected back to the optical fiber 112 shows an interference spectrum, in particular interference maxima or interference minima, the number or position of which depends on the cavity length 111, in particular the spacing d between the fiber end face 131 and the reflective membrane surface. Through an analysis of the position of the interference maxima or the interference minima in the reflective spectrum, a change of the cavity length 111 or in particular an acceleration-dependent deflection of the deflection mass 123 can be determined.

According to embodiments, the reflective membrane surface is provided on the deflection mass. The reflective membrane surface, for example the axial membrane surface 133, is particularly oriented perpendicular to the axis 127. In particular, the reflective membrane surface and the fiber end face 131 are oriented at least substantially parallel to each other.

According to embodiments, the connection bridges 125 connect the membrane frame 121 and the deflection mass 123 at at least two axial positions different from each other, as for example shown in the FIGS. 1 and 2. Herein, the term "axial" is particularly to be understood with reference to the axis 127. The connection bridges 125 can be configured as resilient elements between the membrane frame 121 and the deflection mass 123. The acoustic membrane 103 is particularly adapted such that the deflection mass 123 is deflected in case of an acceleration acting upon the fiber optical acceleration sensor 110, for example relative to a rest position of the deflection mass 123. The deflection mass 123 is particularly deflected in case of an acceleration which is orienteered along the axis 127 or in case of an acceleration which comprises a component which is oriented along the axis 127.

Via a connection of the deflection mass 123 to the membrane frame 121, a deflection of the deflection mass 123 can, for example, be reduced at least substantially to a movement of the deflection mass 123 along the axis 127. In particular, tippings of the deflection mass 123 can be reduced. Amongst others, a cross-sensitivity of the fiber optical acceleration sensor 110, for example in rotation accelerations, can be reduced compared to known accelerations sensors. A further advantage can be that a mass of the deflection mass 123 extends along the axis 127 and may have a greater mass, in particular without any asymmetrical distribution of the mass pertaining to the axis 127. For example, the fiber optical acceleration sensor 110 may have a higher sensitivity, especially due to the greater mass. Besides, the stability of the acoustic membrane 103 can be increased through a connection of the deflection mass 123 to the membrane frame 121 at at least two axial positions.

According to some embodiments, the connection bridges 125 are formed between the membrane frame 121 and the deflection mass 123 as meandering arms. Especially, the connection bridges 125 each have a first connection site 151 to the membrane frame 121 and a second connection site 153 to the deflection mass 123, wherein the first connection site 151 in the circumferential direction is offset to the second connection site 153 about the axis 127. In embodiments, a meandering arm comprises in particular at least three arm sections, wherein at least two of the arm sections are at least substantially radially oriented and at least one arm section, at least substantially in the circumferential direction, is oriented about the axis 127. The formulation "at least substantially radially" means, for example, a deviation of maximum 30°, in particular maximum 20° or maximum 10°, compared to a radial direction. The formulation "at least substantially in the circumferential direction" means, for example, a deviation of maximum 30°, in particular maximum 20° or maximum 10°, compared to a circumferential direction. The connection bridges 125 of the acoustic membrane 103 illustrated in FIG. 2 are designed as meandering arms, for example.

According to embodiments, the acoustic membrane 103, at the at least two axial positions, comprises respectively at least two, especially three, connection bridges 125. The acoustic membrane 103 at the at least two axial positions comprises, for example, in each case precisely three or precisely four connection bridges 125. In the exemplary embodiment of FIG. 2, the acoustic membrane 103, at the two axial positions, comprises in each case three connection bridges 125.

According to some embodiments, the connection bridges 125 comprise first connection bridges at a first axial position of the at least two axial positions and second connection bridges at a second axial position of the at least two axial positions, wherein the first connection bridges in the circumferential direction are arranged offset to the second connection bridges about the axis 127. For example, respective first connection sites 151 of the first connection bridges and the second connection bridges can be arranged offset relative to each other in the circumferential direction, or respective second connection sites 153 of the first connection bridges and the second connection bridges can be arranged offset relative to each other in the circumferential direction. In FIG. 2, the connection bridges 125 are arranged offset i the circumferential direction about the axis 127. For example, at the two axial positions, the respective connection bridges 125, for example the respective first connection sites 151 between the connection bridges 125 and the membrane frame 121 or the respective second connection sites 153 between the connection bridges 125 and the deflection mass 123, are arranged offset by 60° to each other in the circumferential direction. For example, a cross-sensitivity of the deflection of the deflection mass 123 can be reduced through an arrangement of the connection bridges 125, said arrangement being offset in the circumferential direction.

In embodiments, an axial length of the deflection mass 123 or an axial spacing 155 between the at least two axial positions is at least 0.1 mm, in particular at least 0.2 mm or at least 0.5 mm or maximum 5 mm, in particular maximum 3 mm or maximum 1.5 mm. According to embodiments, the acoustic membrane 103 has a diameter transversely to the axis 127 of at least 1 mm, in particular of least 2 mm, or of maximum 10 mm, in particular of maximum 7 mm or maximum 5 mm. In embodiments, the acoustic membrane 103 has a natural frequency of at least 5 kHz, in particular of at least 10 kHz, or of maximum 500 kHz, in particular of maximum 200 kHz or maximum 100 kHz.

According to embodiments, the acoustic membrane is adapted for a mechanical deflection of the deflection mass of at least 0.25 nm/G, in particular of at least 0.5 nm/G or of at least 1 nm/G or of maximum 40 nm/G, in particular of maximum 30 nm/G, of maximum 25 nm/G or, for example, of maximum 20 nm/G. "G" herein represents the acceleration of gravity, for example rounded 9.81 m/s$^2$.

In some embodiments, the acoustic membrane 103 is made in one piece. The acoustic membrane 103 is particularly made of a single material, for example of a single, transparent material. Through a manufacture from a single material, tensions in the acoustic membrane 103 can be avoided, for example. According to embodiments, the acoustic membrane 103 is made of glass, especially of quartz glass or borosilicate glass.

In embodiments, the acoustic membrane 103 is made by selective laser etching ("selective laser etching", SLE). For example, in case of selective laser etching, a substrate, in particular a glass substrate from quartz glass or borosilicate glass, is provided. The shape of the acoustic membrane 103 is first pressed into the substrate by the laser, wherein in particular the regions of the substrate are modified around the acoustic membrane 103 in a targeted manner through the laser radiation, for example chemically modified. Subsequently, the modified regions of the substrate can be selectively etched. The modified regions of the substrate can particularly be removed with a higher etching rate than the non-modified structure, which is impressed into the substrate, of the acoustic membrane 103.

According to some embodiments, the acoustic membrane 103, in particular the deflection mass 123, has a high-reflective coating. Herein, the wording "high-reflective" is to be understood such that at least 50% of an incident light, for example, at least 70% or at least 90%, are reflected. For example, the axial membrane surface 133 of the deflection mass 123, facing the cavity 107, can be coated with a high-reflective coating, as is shown by way of example in FIG. 1. In further embodiments, a rear membrane surface facing away from the cavity 107 can be coated with a high-reflective coating. By providing a high-reflective coating, a higher intensity of the reflected light can be provided, for example.

According to embodiments, the high-reflective coating can be produced, for example through evaporating a layer of metal or a metal alloy on the acoustic membrane 103, in particular on the deflection mass 123. In further embodiments, the acoustic membrane 103 has no high-reflective coating. For example, light which is incident upon the acoustic membrane 103 can be at least partially reflected on a surface of the acoustic membrane 103, for example at a transition between glass and air.

In embodiments, the deflection mass 123 comprises an axial membrane surface 133 facing the cavity 107 and behind the axial membrane surface 133 a interruption region for diffuse light scattering. The axial membrane surface 133 is designed as a reflective membrane surface. In the interruption site region, the light which is transmitted through the axial membrane surface 133 can be scattered in a diffuse manner. Interruption sites of the interruption site region can be introduced in the deflection mass 123 with a laser.

According to an embodiment, the fiber optical acceleration sensor 110 is designed as a Fabry-Perot-interferometer. The fiber end face 131 of the optical fiber 112 forms a first mirror of the Fabry-Perot-interferometer and the acoustic membrane 103, in particular the deflection mass 123 forms a second mirror of the Fabry-Perot-interferometer.

In embodiments, the optical fiber 112 is formed as glass fiber or a polymer guide, wherein materials such as optical polymers, polymethylmetacrylate, polycarbonate, quartz glass, ethylene-tetrafluorethylene can be used which are doped, if applicable. The optical fiber 112 can particularly be formed as a SMF-28 fiber.

The optical fiber 112 is held by a fiber holder 161 of the fiber optical acceleration sensor 110. The fiber holder 161 can be arranged in a sensor housing (not shown) of the fiber optical acceleration sensor 110. The sensor housing can particularly surround a volume about the acoustic membrane 103. According to an embodiment, the fiber holder 161 is arranged with the optical fiber 112, in particular with an end piece of the optical fiber 112 with the fiber end face 131, in a measurement position relative to the acoustic membrane 103. In particular, the optical fiber 112 is attached to the fiber holder 161 by adherence or brazing.

According to some embodiments, the fiber optical acceleration sensor 110 or an end piece of the optical fiber 112 has at least one optical beam forming component, for example on the fiber end face 131, to form a light beam exiting from the optical fiber 112. For example, the optical beam forming component has at least one of the following: a gradient-index lens (GRIN lens), a prism, a spherical lens, a cylinder lens and any combination thereof. According to a further embodiment, the optical fiber 112 can be formed as a monomode fiber.

According to embodiments, a fiber optical acceleration sensor system is provided, with at least two fiber optical acceleration sensors according to embodiments described herein, wherein the fiber optical acceleration sensor system is adapted to determine accelerations along at least two axes. The acceleration sensor system can particularly comprise two or three fiber optical acceleration sensors. In embodiments, at least two of the axes of the at least two fiber optical acceleration sensors are not oriented in parallel, are, in particular, oriented at least substantially orthogonally to each other. The fiber optical acceleration sensor system can be arranged in or on a rotor blade, for example.

According to embodiments, a wind turbine is specified, with at least one fiber optical acceleration sensor according to embodiments described herein or at least one fiber optical acceleration sensor system according to embodiments described herein. The wind turbine comprises in particular a rotor blade, wherein the at least one fiber optical acceleration sensor or the at least one fiber optical acceleration sensor is arranged in or on a rotor blade. According to embodiments, the wind turbine comprises two or three rotor blades, wherein at least one fiber optical acceleration sensor or at least one fiber optical acceleration sensor system is arranged on each of the rotor blades. It may be beneficial that a fiber optical acceleration sensor according to embodiments described herein has a lower cross-sensitivity compared to rotation accelerations which may in particular occur when a wind turbine is in operation.

FIG. 3 shows a wind turbine 200 as an example of use for a fiber optical acceleration sensor 110 described herein, for example with reference to FIGS. 1 and 2. The wind turbine 200 comprises a tower 202 and a nacelle 203. A rotor 500 is attached to the nacelle 203. The rotor 500 comprises a hub 205, to which rotor blades 100 are attached. As shown in FIG. 3, at least one sensor unit 110 is provided for fiber optical acceleration measurement on a rotor blade 100. The sensor unit 110 is connected to an evaluation unit 114 via an optical fiber 112. The evaluation unit 114 sends, for example, a signal to a control unit 204 of the wind turbine 200 for controlling or regulating the wind turbine 200. The rotor blade 100 has a blade axis 101 along its longitudinal extent. The length of the rotor blade 100 extends from a blade flange to a blade tip, wherein no electrical lines are present in a convenient manner in this region. In contrast, fiber optical acceleration sensors can be placed as desired along the longitudinal extent of the rotor blade. The fiber optical acceleration sensor 110 can be arranged at a radial position in a outer region of the rotor blade 100, for example.

According to some embodiments, an optical signal, such as for example an interference spectrum, can be transmitted to the evaluation unit 114 by means of the optical fiber 112. Each rotor blade 100 can have individual accelerations, in particular vibrations or oscillations. Hence, according to some embodiments, at least one fiber optical acceleration sensor 110 is provided in each rotor blade 100.

To provide a fiber optical acceleration sensor 110 as is shown by way of example in FIG. 1, in particular simply on a rotor blade, in particular in a outer radial region of the rotor blade, it is advantageous that the fiber optical acceleration sensor 110, in a cross section perpendicular to the axis 127, has a small dimension. A maximum dimension in a cross section perpendicular to the axis 127 can be 10 mm or less, for example.

FIG. 4 shows, as example of use for the fiber optical acceleration sensor 110, the rotor 500 of a wind turbine, on which acceleration measurements are to be conducted. The rotor 500 has a hub 205 and rotor blades 100 arranged thereon. An acceleration sensor 110 is provided in at least one of the rotor blades 100. The signal of the fiber optical acceleration sensor 110 is directed to a distributor 501 via the optical fiber 112. For example, the distributor 501 can be a field distributor, on which several signals of different sensors are provided. The distributor 501 can be disposed on the blade bulkhead of the rotor blade 100 and can be configured for plugging and dismantling a signal cable of a sensor, for example an optical fiber 112 of a fiber optical acceleration sensor 110. Furthermore, a sensor cable can be provided for plugging and dismantling of the field distributor to the measuring device or to the evaluation unit 114. According to some embodiments, the distributor 501 is arranged on the bulkhead sensor or in the blade root.

As shown in FIG. 4, a transmission light guide 503, for example a further optical fiber, can be directed from the distributor 501 to the evaluation unit 114. For example, the transmission light guide 503 can be directed along a spring or a spiral or through a spring or a spiral or a corresponding mechanical element so that the transmission light guide 503 is not damaged when rotating the rotor blade 100 about its blade axis 101, in particular when pitching the rotor blade 100. The mechanical directing of the transmission light guide 503 along a spiral or through a spiral thus permits a torsion of the transmission light guide 503.

FIG. 4 shows a fiber optical acceleration sensor 110 in each one of the rotor blades 100. Moreover, it is possible to perform a measurement of the acceleration at several positions along the blade axis 101 of a rotor blade 100 at several positions of the blade axis 101 of the rotor blade 100. For this purpose, several fiber optical acceleration sensors 110 can be provided on the respective position. Furthermore it can be convenient to use fiber optical acceleration sensors 110 close to the rotor blade tip of a wind turbine, which means in regions which lie radially far outside, of the rotor 500. For this purpose, a fiber 112 needs to be displaced to the blade tip when retrofitting a fiber optical acceleration sensor 110.

FIG. 5 schematically shows a measurement system 600 with a fiber optical acceleration sensor 110 according to embodiments described herein. The measurement system 600 comprises one or more fiber optical acceleration sensors 110. The measurement system 600 has a source 602 for electromagnetic radiation such as for example a primary light source. The source 602 serves to provide optical radiation with which at least one fiber optical acceleration sensor 110 can be irradiated. To this end, an optical transmission fiber or a light guide 603 is provided between the primary light source 602 and the first fiber coupler 604. The fiber coupler 604 couples the primary light into the optical fiber 112. For example, the source 602 can be a broadband light source, a laser, a LED (light emitting diode), a SLD (Superluminescent diode), a ASE-light source (Amplified Spontaneous Emission-Light Source) or a SOA (Semiconductor Optical Amplifier). Several sources of the same or different type may also be used for embodiments described herein.

According to embodiments, the optical fiber 112 of the fiber optical acceleration sensor 110 is optically coupled to an optical resonator 302 of the fiber optical acceleration sensor 110, wherein the optical resonator 302, in particular the fiber end face 131 of the optical fiber 112, comprises the acoustic membrane 103 and the cavity 107 formed between the fiber end face 131 and a reflective membrane surface. The light reflected back from the at least one fiber optical acceleration sensor 110 is directed again via the fiber coupler 604 which guides the light into a beam splitter 606 via an additional transmission fiber 605. The beam splitter 606 splits the reflected-back light for the detection by means of a first detector 607 and a second detector 608. In this regard, the signal detected on the second detector 608 is first filtered with an optical filter device 609. By the filter device 609, a position of a interference maximum or minimum output from the optical resonator 302 or a wave length change by the optical resonator 302 and thus an acceleration can be detected.

In general, a measurement system, as is shown by way of example for the measurement system 700 in FIG. 6, can also be provided without the beam splitter 606 or the detector 607. However, the detector 607 enables a normalization of the measurement signal of the fiber optical acceleration sensor 110 with reference to different intensity fluctuations, as for example oscillations of the intensity of the source 602, oscillations by reflections at interfaces between individual light guides, oscillations by reflections at interfaces between the optical fiber 112 and the fiber coupler 604 or other intensity oscillations. This normalization improves the measurement accuracy and, when the measurement system is operated, reduces a dependence of the length of the optical fiber 112 provided between the evaluation unit 114 and the fiber optical acceleration sensor 110.

FIG. 6 shows an embodiment of an evaluation unit 114, wherein a signal of a fiber optical acceleration sensor 110 is directed to the evaluation unit 114 via an optical fiber 112. Furthermore, FIG. 6 shows a light source 602, which can be optionally provided in the evaluation unit. Yet, the light source 602 can also be provided independently of or outside the evaluation unit 114. The optical signal of the fiber optical acceleration sensor 110, in particular the optical interference signal, which can have interference maxima and interference minima, is converted into an electrical signal with a detector, for example with a converter 702. The evaluation unit 114 can comprise an opto-electronic converter for converting the optical signal into an electrical signal. For example, a photodiode, a photomultiplier (PM) or another opto-electronic detector can be used as converter. The electrical signal can be filtered with an analog anti-aliasing-filter 703. Following the analog filtering with an analog anti-aliasing-filter or low-pass filter 703, the signal is digitalized by means of an analog-digital-converter 704. FIG. 6 further shows a digital evaluation unit 706 which, for example, can comprise a CPU, a memory and other elements for digital data processing.

The optical filter device 609 or additional optical filter devices for filtering the interference spectrum or for detecting interference maxima and interference minima can comprise an optical filter selected from the group consisting of one or more edge filters, a thin layer film, a Fiber Bragg Grating, an Arrayed-Waveguide-Grating (AWG), an Echelle-Grating, a grating arrangement, a prism, and any combination thereof.

According to an embodiment which can be combined with other embodiments described herein, it is possible to resolve a wave length displacement of up to 2 pm with the described evaluation unit 114. Based on interference minima, this means a change of the cavity length 111 of 0.001 μm.

According to embodiments, a method 800 for the manufacture of a fiber optical acceleration sensor for determining an acceleration along an axis is specified, as for example schematically shown in FIG. 7. In block 810, the method 800 comprises a provision of a transparent substrate. For example, the substrate can consist of glass, for example of quartz glass or of borosilicate glass. In block 820, a selective laser etching of an acoustic membrane from the transparent substrate takes place, wherein the acoustic membrane comprises a membrane frame, a deflection mass and connection bridges, and wherein the connection bridges connect the membrane frame and the deflection mass at at least two axial positions different from each other. The acoustic membrane can be formed according to embodiments described herein. The selective laser etching comprises, for example, impressing a structure of the acoustic membrane into the substrate. The impressing comprises, for example, a modification, in particular a chemical modification by laser radiation, of the regions of the substrate which surround the structure of the acoustic membrane. The selective laser etching can further comprise a selective etching of the regions of the substrate, said regions being modified by the laser radiation. In particular, the modified regions of the substrate can be etched onto the substrate with a higher etching rate by using an etching means. The acoustic membrane can be etched from the substrate through the selective etching of the modified regions.

According to embodiments, the method 800 can further comprise an arrangement of the acoustic membrane relative to the fiber end face of an optical fiber. The membrane frame, the acoustic membrane and the optical fiber can particularly be connected to a sensor housing. In particular, the acoustic membrane and the optical fiber can be arranged in such a way that the fiber end face is arranged at least substantially perpendicular to the axis.

Although the present invention has been described above with the aid of typical exemplary embodiments, it is not limited thereto, but can be modified in a variety of ways. Also, the invention is not limited to the usage possibilities mentioned.

It should be noted at this point that the aspects and embodiments described herein can be adequately combined with each other and that individual aspects can be left out there where it is expedient and possible within the scope of the action by the person skilled in the art. Modifications and additions of the aspects described herein are known to the person skilled in the art.

The invention claimed is:

1. A fiber optical acceleration sensor for determining an acceleration along an axis, comprising
an optical fiber with a fiber end face; and
an acoustic membrane with a membrane frame, a deflection mass and connection bridges;
wherein the acoustic membrane is adapted to at least partially reflect a primary radiation exiting from the fiber end face;
wherein the connection bridges connect the membrane frame and the deflection mass at at least two axial positions different from each other;
wherein the fiber optical acceleration sensor is configured as a Fabry-Perot-interferometer;
wherein the fiber end face of the optical fiber forms a first mirror of the Fabry-Perot-interferometer; and
wherein the acoustic membrane forms a second mirror of the Fabry-Perot-interferometer.

2. The fiber optical acceleration sensor according to claim 1, wherein the connection bridges are configured between the membrane frame and the deflection mass as meandering arms.

3. The fiber optical acceleration sensor according to claim 1, wherein the acoustic membrane at the at least two axial positions comprises at least two of the connection bridges.

4. The fiber optical acceleration sensor according to claim 1, wherein the connection bridges comprise first connection bridges at a first axial position of the at least two axial positions and second connection bridges at a second axial position of the at least two axial positions; and wherein the first connection bridges are arranged offset to the second connection bridges about the axis in a circumferential direction.

5. The fiber optical acceleration sensor according to claim 1, wherein an axial spacing between the at least two axial positions is at least 0.1 mm and/or maximum 5 mm.

6. The fiber optical acceleration sensor according to claim 1, wherein the acoustic membrane is adapted for a mechanical deflection of the deflection mass of at least 0.25 nm/G and/or of maximum 40 nm/G.

7. The fiber optical acceleration sensor according to claim 1, wherein the acoustic membrane is made in one piece and/or wherein the acoustic membrane is made of glass.

8. The fiber optical acceleration sensor according to claim 1, wherein the acoustic membrane is made by selective laser etching.

9. The fiber optical acceleration sensor according to claim 1, wherein the acoustic membrane comprises a high-reflective coating.

10. The fiber optical acceleration sensor according to claim 1, comprising a cavity formed between the fiber end face and the acoustic membrane; wherein the deflection mass comprises an axial membrane surface facing the cavity; and wherein the deflection mass behind the axial membrane surface comprises an interruption region for diffuse light scattering.

11. A fiber optical acceleration sensor system, comprising at least two fiber optical acceleration sensors according to claim 1, wherein at least one of the at least two fiber optical acceleration sensors is adapted for determining accelerations along at least two axes.

12. A wind turbine, comprising at least one fiber optical acceleration sensor according to claim 1.

13. The wind turbine according to claim 12, comprising at least one rotor blade; wherein the at least one fiber optical acceleration sensor or the at least one fiber optical acceleration sensor is arranged in or on the at least one rotor blade.

14. The fiber optical acceleration sensor according to claim 1, wherein the deflection mass at the at least two axial positions comprises at least three of the connection bridges.

15. The fiber optical acceleration sensor according to claim 1,
wherein the acoustic membrane is made of quartz glass.

16. The fiber optical acceleration sensor according to claim 1, wherein the deflection mass of the acoustic membrane comprises a high-reflective coating.

17. The fiber optical acceleration sensor according to claim 1, wherein an axial spacing between the at least two axial positions is at least 0.2 mm and/or maximum 3 mm.

18. The fiber optical acceleration sensor according to claim 1, wherein the acoustic membrane is adapted for a mechanical deflection of the deflection mass of at least 0.5 nm/G and/or of maximum 30 nm/G.

* * * * *